United States Patent Office 3,753,969
Patented Aug. 21, 1973

3,753,969
METHOD FOR SYNTHESIZING PYROGLUTAMYL-HISTIDYL-PROLINAMIDE
Karl Folkers, 6406 Mesa Drive, Austin, Tex., and Jan B. Boler, Oslo, Norway, and Jaw-Kang Chang, Austin, Tex., said Boler and Chang assignors to said Folkers
No Drawing. Filed Dec. 22, 1969, Ser. No. 887,432
Int. Cl. C07c 103/52; C07g 7/00
U.S. Cl. 260—112.5      7 Claims

ABSTRACT OF THE DISCLOSURE

A method for synthesizing a tripeptide, pyroglutamyl-histidyl-prolinamide, which has the same potent activity of the thyrotropin releasing hormone of the hypothalamus gland of mammals is provided by utilizing, as the starting materials, the amino acids, pyroglutamic acid, histidine and proline. Synthesis of the desired product is accomplished by coupling histidine with either pyroglutamic acid or proline and then coupling the resultant product with the remaining, uncoupled amino acid to obtain pyroglutamyl-histidyl-prolinamide.

---

This invention relates to a method for synthesizing the tripeptide, L - pyroglutamyl - L - histidyl-L-prolinamide, which exhibits identical biological and hormonal activity, both in vivo and in vitro, as the thyrotropin releasing hormone of the hypothalamus gland of mammalian species which method is simple, economical, flexible and highly productive.

BACKGROUND OF THE INVENTION

The thyrotropin releasing hormone (TRH) is one of the six or seven neurohormones of the hypothalamus gland of mammalian species, including man. Presently, TRH is extracted from the glands of porcine hypothalami or other animals only by a very extensive fractionation process which is prohibitively expensive with regard to veterinary and medical use. For example, only 7.2 mg. of the hormone having a purity of only 30% has been extracted from the glands of 265,000 pigs as reported by A. V. Schally, C. Y. Bowers, T. W. Redding and J. F. Barrett, Biochemical and Biophysical Research Communications, 1966, vol. 25, p. 165, and by A. V. Schally, T. W. Redding, C. Y. Bowers and J. F. Barrett, Journal of Biological Chemistry, 244, 4077 (1969). Consequently, preparation of the hormone exhibiting a purity of only about 30% would not be as desirable medically, as having the pure, synthetically produced compound since the naturally extracted hormone exhibits varying contamination with related hormones and impurities while the pure, synthetically produced compound would be free of such contamination with biologically active and undesirable related peptides. Since great fractionation effect and high cost are involved in the production of the natural hormone thereby precluding its general use, a method for synthetic production of the compound is not only highly practical, but will support extensive and commercial use.

In copending application Ser. No. 859,559, filed Sept. 19, 1969, there is disclosed and described a method for producing pyro-glutamyl-histidyl proline amide ((pyro) Glu-His-Pro (NH$_2$)) which was found to have the same activity as the natural occurring TRH of the hypothalamus gland obtained from mammals. This method involved converting the free, inactive tripeptide, α-glutamyl-histidyl proline, to the dimethylester by reacting the tripeptide with anhydrous methanol containing hydrogen chloride and then reacting the dimethyl ester with methanol and ammonia to obtain the biologically active amide form of the tripeptide, (pyro) Glu-His-Pro (NH$_2$).

The thyrotropin releasing hormone has been found to be of great value in medicine for its use in the diagnositic evaluation of the functioning of the anterior pituitary gland. The synthetic compound, (pyro) Glue-His-Pro (NH$_2$), produced in accordance with the method disclosed in the above-identified U.S. application, can be used for exactly the same purpose. Presently, those methods in medicine utilized for testing pituitary function included the estimation of pituitary hormones in blood and urine by the determination of responses to Metipirone, Piromen, Vasopressin and its analogs, insulin, propylthiouracil or thyroid, adrenal or gonadal hormones. Tests with each of these materials are valuable, but because of adverse side effects of some of these materials, the complexity of their effects, the expense of using these materials, and the rather limited responses they produce, clinicians are discouraged from frequently using these materials.

The above-identified synthetically produced (pyro) Glu-His-Pro (HN$_2$) has specificity of action and can, therefore, be used quickly, easily and accurately on out-patients as well as hospitalized patients by intravenous of subcutaneous injection and, about thirty minutes later, a blood sample can be taken from the patient for the measurement of the release of the pituitary hormone. Adverse side reactions have been found to be diminished and the synthetic compound can be given repeatedly and in larger amounts than natural TRH has ever been administered so that borderline responses of the pituitary can be easily clarified. Consequently, this synthetic compound will be particularly useful since the release of thyrotropin from the pituitary its uniform and stable in children and adults regardless of sex. Further, use of this synthetic compound can be readily indicated in clinical situations wherein evaluation of pituitary function is indicated.

While the method for producing this synthetic compound as disclosed in the previously-identified copending application was important for its discovery that the product obtained exhibited the same activity as the naturally occurring TRH, it left much to be desired, particularly with respect to the tripeptide starting material, the commercial availability of which could not be consistently relied upon.. Consequently, a simple and more flexible method was sought to produce (pyro) Glu-His-Pro (NH$_2$) which would utilize starting materials that were readily available or producible.

THE INVENTION

It has now been found that (pyro) Glu-His-Pro (NH$_2$) can be synthetically produced by utilizing starting materials which are readily available or which are readily producible. The starting materials which can be utilized are the amino acids, pyroglutamic acid, histidine and proline, preferably in the form of proline amide, in unprotected or protected form. Generally, the method of the invention comprises coupling one of the amino acids, histidine, with one or the other amino acid, either pyroglutamic acid or proline, to obtain a compound having histidine coupled with either pyroglutamic acid or proline, and then coupling the resultant compound with the remaining, uncoupled amino acid; that is, either pyroglutamic acid or proline, to obtain (pyro) Glu-His-Pro (NH$_2$).

Stated another way, each of the amino acids, pyroglutamic acid, histidine and proline can be designated as A, B, and C, respectively, and (pyro) Glu-His-Pro (NH$_2$) can then be considered as a derivative of ABC. Therefore, the hormonally active synthetic compound (pyro) Glu-His-Pro (NH$_2$), can be produced in accordance with the following equations wherein A represents pyroglutamic acid, B represents histidine and C represents proline. In Part I below, it can be seen that in Equation 1, A+B gives AB, and in Equation 2 AB+C gives ABC.

$$A + B \rightarrow AB \quad (1)$$
$$AB + C \rightarrow ABC \quad (2)$$

Alternatively, in Part II below, B+C gives BC, as in Equation 3, and BC+A gives ABC, as in Equation 4.

$$B + C \rightarrow BC \quad (3)$$
$$BC + A \rightarrow ABC \quad (4)$$

It should be noted, however, that in each instance illustrated above in Part I and Part II, the starting amino acid is always B (histidine) which is coupled either with A (pyroglutamic acid), or C (proline) to obtain either AB, as in Equation 1, or BC, as in Equation 3. The product, either AB or BC, is then coupled with the other, unreacted amino acid, as in Equations 2 and 4 to obtain the final product, ABC.

As mentioned earlier, pyroglutamic acid (A) can be used in an unprotected as well as in a protected form and histidine (B) can be used in an unprotected as well as a protected form as far as the imidazole nucleus is concerned. Although the amino acid, proline, can also be used in a protected form, it needs no protective group to be removed at the end in accordance with the synthesis of the invention. Illustrative of the compounds which can be employed as the starting materials in protected form are such compounds as N-carbobenzoxy-L-pyroglutamic acid, L-histidine methylester, pyro glutamyl histidine methylester, N-tert-butyloxycarbonyl-N-im-benzyl-L-histidine, N-carbobenzoxy-L-pyroglutamic acid dicyclohexylamine salt, and the like. Hence, the protective groups which can be employed include carbobenzoxy, benzyl, N-t-butyloxycarbonyl, p-toluene-sulfonyl, and the like.

The steps illustrated in Part I above, therefore, can be seen to be comparatively simple and not need, but can, employ protective groups and the product ABC can be obtained directly and be readily purified as the hormonally active synthetic compound.

Therefore, A can be either (pyro) Glu (OH) or Cbz (pyro) Glu (OH); that is, unprotected or protected, respectively. Hence, if one of the amino acids is used in a protected form, the protecting group is appropriately removed. For example, in Part II above, a protected A and B and BC are utilized and a protected ABC is obtained. After removal of the protecting groups from the protected ABC, ABC itself is obtained.

The reactions illustrating the synthesis of the invention, as set forth in Parts I and II, above are reproduced below in greater detail in Schemes I and II wherein the letter designations, ABC, are replaced with the chemical formula or structure of the amino acid or peptide used. In Scheme I, the conventional organic structures for the amino acids corresponding to Parts I and II are depicted, while Scheme II illustrates, in structural form, the reactions corresponding to Parts I and II. It can be seen in Schemes I and II below that use of the letters, ABC, helps to illustrate, in principle, the equivalent variations. The abbreviations, terms and symbols set forth in Schemes I and II, and not otherwise identified or defined, while conventional in modern biochemistry, are identified and defined on page 11a following Schemes I and II.

SCHEME I.—PART I

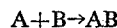
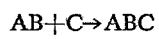
Cbz(pyro)Glu(OH) + His(OCH₃) ⟶
[A]     [B]
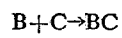

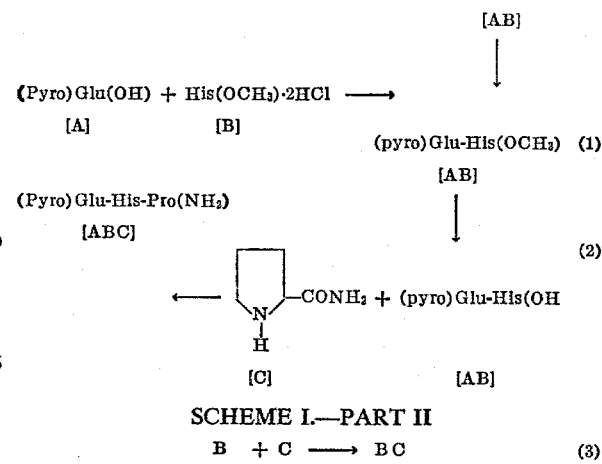

SCHEME I.—PART II

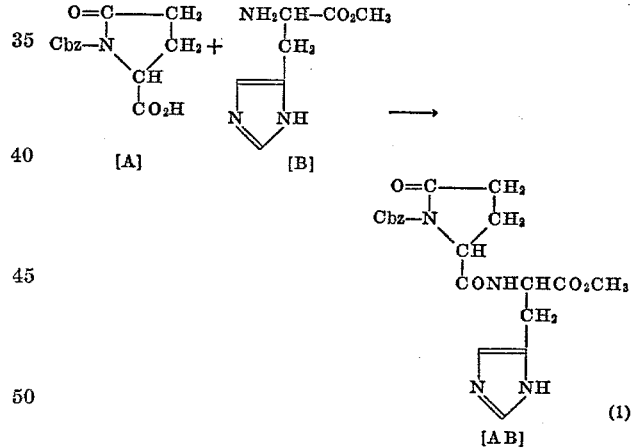

SCHEME II.—PART I

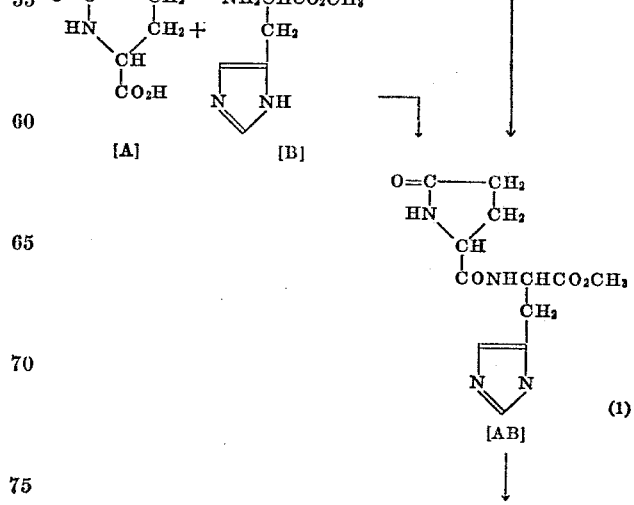

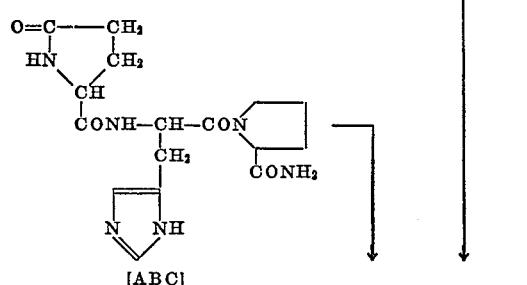

[ABC]

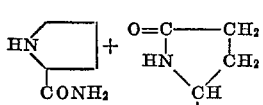

[C]     [AB]

SCHEME II.—PART II

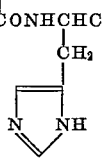

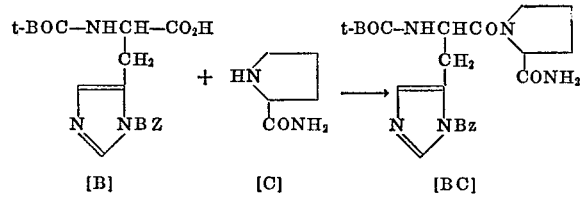

[B]     [C]     [BC]

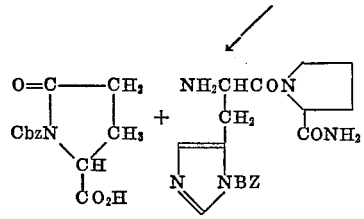

[A]     [BC]

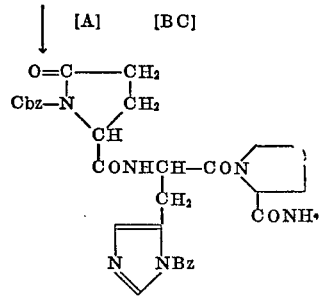

[ABC]

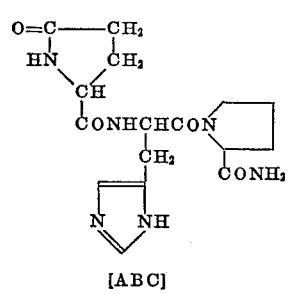

[ABC]

| Terms/symbols: | Definition/identification |
|---|---|
| BOC | Butyloxycarbonyl. |
| Bz | Benzyl. |
| Cbz | Carbobenzoxy. |
| $CDCl_3$ | Deuteritic chloroform. |
| $CH_3OH$-$d_4$ | Methanol tetradeuterio. |
| M/e | Molecular ion/charge on molecule; measurement of peaks in mass spectrum. |
| NMR | Nuclear magnetic resonance. |
| TLC | Chromatographic evaluation. |
| TMS | Tetramethyl silane. |
| Singlet | Denotes single peak in NMR spectrum. |
| Multiplet | Denotes two or more peaks in NMR spectrum. |
| Broad | Denotes peaks in NMR spectrum are not distinguishable. |

Comparative analyses of the synthetically produced (pyro) Glu-His-Pro ($NH_2$) obtained in accordance with the method of the invention, were made with naturally occurring TRH extracted from the hypothalamus gland of porcine and ovine mammals. These analyses involved comparing the chromatographic ($R_f$) values of these compounds in a plurality of systems, as well as comparing the biological activity and potency of the naturally occurring TRH and the synthetically produced (pyro) Glu-His-Pro ($NH_2$) as determined by radioactive iodine ($I^{125}$) and triiodothyronine ($T_3$).

The novel method of synthesizing (pyro) Glu-His-Pro ($NH_2$) in accordance with the invention will become more clear when considered together with the following examples, which are set forth as being illustrative of, and should be understood as not being limitative of, the invention. In the following examples, the dimethylformamide utilized was purified as described by A. B. Thomas and E. G. Rochow in the Journal of American Chemical Society, vol. 79, p. 1843 (1957), and was kept over commercially obtained molecular sieves, such as those produced by Union Carbide Corporation and identified by them as No. 4A; the triethylamine employed was dried over potassium hydroxide (KOH) and distilled prior to use; and, the dicyclohexylcarbodiimide employed was taken from a fresh bottle and dissolved in dimethylformamide before being added to the reaction mixture. In the examples I–V correspond to Part I while VI–IX correspond to Part II.

EXAMPLE I

Preparation of pyroglutamyl-histidine methylester 1.21 g. (5 mmoles) of L-histidine methylester dihydrochloride, obtained as described by A. B. Thomas and E. G. Rochow in Helvetica Chimica Acta, vol. 35, p. 1109 (1953), was suspended in 5 ml. of dimethylformamide and, to the resulting suspension, there was added 1.40 ml. (10 mmoles) of triethylamine. The mixture was stirred for ½ hour and the precipitated triethylamine hydrochloride was filtered off and washed with 1 ml. of fresh solvent. To the solution of the free L-histidine methylester there was added 0.64 g. (5 mmoles) of pyroglutamic acid and 1.24 g. (6 mmoles) of dicyclohexylcarbodiimide, the latter being dissolved in 1 ml. of dimethylformamide.

The mixture was stirred at room temperature and the advancement of the reaction was followed on TLC (Silica Gel G, having a $CHCl_3$:$CH_3OH$ ratio of 4:1) at regular intervals. After 48 hours, 0.2 g. (1 mmole) of fresh dicyclohexylcarbodiimide was added to the reaction mixture and stirring was continued for 24 hours. The precipitated dicyclohexylurea was then filtered off, washed twice with 1 ml. portions of dimethylformamide, and the solvent was evaporated in vacuo below 40° C. The residual oil crystallized upon the addition of 3 ml. ethyl acetate and the crystalline residue was worked well with ethylacetate, filtered rapidly and dried in vacuo. The crude product was a slightly yellowish, fine powder weighing 1.88 g. Several attempts to recrystallize this material from different solvents, such as ethylacetate, ethanol, methanol, chloroform and mixtures of these, failed. The final, purified product was obtained by preparative TLC-chromatography on Silica Gel G, developed in 15% methanol in chloroform, and the area corresponding to an $R_f$ value of 0.3 was scraped and eluted with 20% methanol in chloroform. The pure dipeptide methylester (pyroglutamyl-histidine methylester) was obtained as white crystals after evaporation of the solvent and was found to decompose at about 202–204° C.

Analysis for $C_{12}H_{16}O_4N_4$ having a molecular weight of 280.28 was as follows:

Calculated (percent): C, 51.30; H, 5.75; N, 19.99. Found (percent): C, 51.12; H, 5.69; N, 19.63.

In the NMR spectrum ($CH_3OH$-$d_4$, values relative to TMS) the following absorptions were distinguished:

| | |
|---|---|
| 2-H His— | $\tau$=2.42 (s) |
| 4-H His— | $\tau$=3.13 (s) |
| —COOCH$_3$— | $\tau$=6.30 (s) |
| α-H His— | $\tau$=5.3 (m) |
| —CH$_2$ His— | $\tau$=6.91 (m) |
| α-H (pyro)Glu— | $\tau$=5.8 (m) |
| —CH$_2$CH$_2$-(pyro)Glu— | $\tau$=7.7 (m) |

(s=singlet, m=multiplet.)

In the mass spectrum, the following ions were found as prominent peaks: M/e 280; M–18; M—CH$_3$OH; M—COOCH$_3$ (196); HisOCH (168); $C_4H_6ON$ (84) represented by the structure:

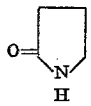

EXAMPLE II

Preparation of N-carbobenzoxy-L-pyroglutamyl-L-histidine methylester

To 1.98 g. of N-carbobenzoxy-L-pyroglutamic acid in 20 ml. dry tetrahydrofuran magnetically stirred at 0° C., were successively added 1.2 ml. triethylamine, 0.8 ml. ethyl chloroformate and, after an hour, 10 ml. of L-histidine methyl ester in chloroform. The L-histidine methyl ester was prepared from 1.61 g. L-histidine methyl ester dihydrochloride salt and 2.4 ml. triethylamine. After being stirred at room temperature for 24 hours, the solvent was evaporated and the reaction mixture was added to 50 ml. water which was extracted with chloroform (2×50 ml.). The extract was dried using magnesium sulfate, and was then filtered and evaporated to obtain 3.10 g. of the oily dipeptide. A portion (430 mg.) of this dipeptide was purified by preparative silica gel plates to obtain 170 g. of the pure N-carbobenzoxy-L-pyroglutamyl-L-histidine methyl ester which was homogeneous in TLC and found to be Pauly and chlorine/tolidine positive.

Analysis in $\tau CDCl_3$ was found to be as follows:

2.70 p.p.m. (singlet, 5H, aromatic protons)

4.80 p.p.m. (singlet, 2H, two methylene protons of the benzyloxy group)

6.38 p.p.m. (singlet, 3H, methyl protons)

EXAMPLE III

Preparation of L-pyroglutamyl-L-histidine methylester 65 mg. of N-carbobenzoxy-L-pyroglutamyl-L-histidine methyl ester, obtained according to Example II, in 10 ml. of absolute methanol containing 5% palladium charcoal as catalyst, was hydrogenated during 24 hours at room temperature and at a pressure of one atmosphere. The reaction mixture was filtered and evaporated to obtain 40 mg. of the pure L-pyroglutamyl-L-histidine methylester having a melting point of about 205°–207° C. at which it decomposed. This product was found to be homogeneous in TLC (silica gel) and was Pauly and chlorine/tolidine positive.

The above reaction was repeated with 2.6 g. of the crude N-carbobenzoxy-L-pyroglutamyl-L-histidine methyl ester from ethanol and ether to obtain 1.3 g. of pure L-pyroglutamyl-L-histidine methyl ester.

EXAMPLE IV

Preparation of pyro-glutamyl-histidine 280 mg. (1 mmole) of pyroglutamyl histidine methyl ester was dissolved in 3 ml. of methanol to which was added 1.3 ml. (1.3 mmoles) of 1 N sodium hydroxide solution. The saponification was followed by TLC and, after 90 minutes complete reaction had taken place, the mixture was neutralized by addition of 1.3 ml. (1.3 mmoles) of 1 N hydrochloric acid and evaporated to complete dryness in vacuo. The solid residue was thoroughly suspended in 5 ml. of dimethylformamide and filtered through a cotton plug into a 15 ml. round bottomed flask. The dipeptide was not further characterized, but coupled directly with proline amide.

EXAMPLE V

Synthesis of pyroglutamyl-histidyl-proline amide (pyro Glu-His-Pro (NH$_2$))

To a solution consisting of 266 mg. (1 mmole) pyroglutamyl histidine, obtained according to Example IV, in dimethylformamide was added 114 mg. (1 mmole) of proline amide, obtained according to the procedures described by R. W. Chambers and F. H. Carpenter, Journal of American Chemical Society, vol. 77, p. 1522, and 236 mg. (1.15 mmoles) of dicyclohexylcarbodiimide dissolved in 1 ml. of dimethylformamide. The reaction mixture was stirred for 40 hours at which time TLC on Silica Gel G showed that the coupling of the pyroglutamyl-histidine-proline amide was virtually completed. The reaction mixture was filtered, the precipitate was washed twice with 1 ml. portions of dimethylformamide, and the solvent was removed in vacuo, leaving a yellowish hygroscopic material. The product was redissolved in methanol and evaporated twice. The solid residue was extracted with ethylacetate and the insoluble material dried well in vacuo.

NMR spectrum data ($CH_3OH$-$d_4$, $\tau$ values relative to TMS) were as follows:

2-H His—$\tau$=2.39 (bs)
4-H His—$\tau$=3.10 (bs)
α-H His—$\tau$=5.55 (m)
α-H (pyro)Glu—$\tau$=5.80 (m)
α-H Pro—$\tau$=6.35 (m)
—CH$_2$ His—$\tau$=7.0 (m)
5-CH$_2$ Pro—$\tau$=7.0 (m)
—CH$_2$CH$_2$-(pyro)Glu—$\tau$=7.7 (m)
—CH$_2$CH$_2$-Pro—$\tau$=8.1 (bm)

(b)=broad; s=singlet; m=multiplet.)

The crude product was a mixture of three components where the desired tripeptide was the major component with an $R_f$ value of 0.15 on Silica Gel G ($CHCl_3$:$CH_3OH$ ratio of 3:7) ninhydrin negative and Pauly and chlorine/tolidine positive. Further purification was carried out on preparative TLC in the system described above.

The product obtained from 530 mg. of crude material weighed 214 mg. and was a viscous oil that still contained some Pauly sensitive material with a lower $R_f$ value.

EXAMPLE VI

Preparation of N-t-butyloxycarbonyl-N$^{im}$-benzyl-L-histidyl-L-prolinamide 1.72 g. of N-tert-butoxycarbonyl-N$^{im}$-benzyl-L-histidine and 0.57 g. of L-prolinamide, obtained as described by R. W. Chambers and F. H. Carpenter, Journal of American Chemical Society, vol. 77, p. 1522 (1955), in 20 ml. dry acetonitrile, was treated with 1.5 g. N,N-dicyclohexylcarbodiimide in 5 ml. acetonitrile at 0° C. After being stirred at room temperature for 12 hours, the reaction mixture was filtered and the filtrate was evaporated in vacuo to dryness. The residue, which was dissolved in 150 ml. CHCl$_3$, was washed with water (2×50 ml.), dried, filtered and evaporated and 2.6 g. oily product was collected.

A portion (450 mg.) of this residue was purified by preparative silica gel plates to afford 250 mg. of the pure dipeptide, N-t-butyloxycarbonyl-N$^{im}$-benzyl-L-histidyl-L-prolinamide, having a melting point of about 77°–79° C.

Analysis in $\tau$CDCl$_3$ was found to be as follows:

8.59 p.p.m. (3-methyl groups, singlet, 9 protons)
4.90 p.p.m. (N-methylene protons of the benzyl group) and 2.70 p.p.m. (aromatic protons).

EXAMPLE VII

Preparation of N$^{im}$-benzyl-L-histidyl-L-prolinamide dihydrobromide

To 220 mg. of dipeptide, N-t-butyloxycarbonyl-N$^{im}$-benzyl-L-histidyl-L-prolinamide, obtained according to Example VI, was added 2 ml. of a saturated solution of hydrogen bromide in acetic acid. After being stirred for 30 minutes at room temperature, the reaction mixture was treated with 30 ml. absolute ether which was then filtered to obtain 270 mg. of N$^{im}$-benzyl-L-histidyl-L-prolinamide dihydrobromide having a melting point of about 195°–198° C. This product was then dissolved in 10 ml. chloroform and ammonia was bubbled through the solution for 15 minutes. The ammonium bromide was filtered off and the filtrate concentrated under vacuum to give 150 mg. of the free base N$^{im}$-benzyl-L-histidyl-prolinamide dihydrobromide.

Analysis in $\tau$CDCl$_3$ was found to be as follows:

4.95 p.p.m. (N-methylene protons of the benzyl group, singlet, 2 protons)
2.70 p.p.m. (aromatic protons)

EXAMPLE VIII

Preparation of N-carbobenzoxy-L-pyroglutamyl-N$^{im}$-benzy-L-histidyl-L-prolinamide 0.45 g. of N-carbobenzoxy-L-pyroglutamic acid dicyclohexylamine salt, obtained as described by H. Gibian and E. Klieger, Liebigs, Annalen Chemie, vol. 640, p. 145 (1961), in 10 ml. dry tetrahydrofuran was magnetically stirred at 0° C. after which there was added 0.1 ml. ethyl chloroformate. After one hour, N$^{im}$-benzyl-L-histidyl-L-prolinamide, prepared from 0.47 g. of N$^{im}$-benzyl-L-histidyl-L-prolinamide dihydrobromide and 0.3 ml. of triethylamine in 10 ml. chloroform, was also added. After being stirred at room temperature for 24 hours, the solvent was evaporated and the reaction mixture was added to 50 ml. water which was extracted with chloroform (3× 50 ml.). The extract was dried using magnesium sulfate and then filtered and evaporated to obtain 0.5 g. of the oily protective tripeptide. This was purified by preparative silica gel plates to afford 0.2 g. of the pure N-carbobenzoxy-L-pyroglutamyl-N$^{im}$-benzyl-L-histidyl-L-prolinamide.

Analysis in $\tau$CDCl$_3$ was as follows:

4.98 p.p.m. (N-methylene protons of the benzyl group, 2 protons)
4.82 p.p.m. (methylene protons of the benzyloxy group, 2 protons)
2.72 p.p.m. (aromatic protons, 10 protons)

EXAMPLE IX

Synthesis of L-pyro-glutamyl-L-histidyl-L-prolinamide 1.2 g. of N-carbobenzoxy-L-pyroglutamyl-N$^{im}$-benzyl-L-histidyl-L-prolinamide, obtained according to Example VIII, in 150 ml. absolute methanol containing 5% palladium charcoal as catalyst, was hydrogenated for 24 hours at room temperature and at a pressure of one atmosphere. The reaction mixture was filtered and was evaporated to obtain 780 mg. of the pure tripeptide which was found to be homogeneous in TLC (silica gel) and Pauly and chlorine/tolidine positive.

The pure tripeptide was found to have R$_f$ values identical with the compound of Example V above in three different solvent systems as set forth below:

| Solvent system | Ratio of components in system | R$_f$ values |
|---|---|---|
| Chloroform/methanol/30% ammonia solution | 60:45:20 | 0.64 |
| n-Propanol/ammonia | 7:3 | 0.51 |
| Ethylacetate/n-butyl alcohol/acetic acid/water | 1:1:1:1 | 0.25 |

It will be apparent from the above examples that the starting materials which can be employed in the sysnthesis of the invention can be readily and directly produced and then coupled to obtain (pyro) Gu-His-Pro (NH$_2$) in a highly purified form.

EXAMPLE X

Hormonal activity and potency of (pyro) Glu-His-Pro (NH$_2$)

The synthetically produced (pyro) Glu-His-Pro (NH$_2$) of the invention was quantitatively examined for the characteristic hormonal activities and potencies in comparison with natural porcine-extracted TRH. Data on the comparison of the hormonal activities and potencies of TRH and the synthetic (pyro) Glu-His-Pro (NH$_2$) was obtained by the triiodothyronine (T$_3$)-TRH method in mice as described by Bowers et al. in Endocrinology, vol. 77, p. 609 (1965) and vol. 81, p. 741 (1967). In this method, the biological response is quantitatively measured by the change, as counts per minute ($\Delta$ c.p.m.) of radioactive iodine (I$^{125}$) in the blood samples before and two hours after intravenous injection of the sample to be assayed. The levels of I$^{125}$ in the blood are proportional to the amount of the induced release of the thyrotropin hormone (TSH) from the pituitary gland. This data is set forth in Table I below wherein each result ($\Delta$ c.p.m.) is the mean average of the changes in the levels of I$^{125}$ in the blood from eight mice and the synthetic (pyro) Glu-His-Pro (NH$_2$) of the invention is denoted by the letters "GHP" while the term "ns" denotes the value was not significant.

TABLE I

[Biological comparison of Procine TRH and (pyro) Glu-His-Pro (NH$_2$) by the T$_3$-TRH method in mice]

| Dose (nanograms) | I$^{125}$ $\Delta$ c.p.m. TRH | GHP | p-value |
|---|---|---|---|
| Control | 24 | | |
| 1 | 582 | 825 | ns |
| 3 | 2,834 | 2,746 | ns |
| 9 | 4,015 | 4,664 | ns |
| Control | 280 | 320 | ns |
| 2 | 1,450 | 1,605 | ns |
| 6 | 4,011 | 4,243 | ns |
| 18 | 5,401 | 5,205 | ns |

The data in Table I above reveals that graded responses were obtained as the dose levels of TRH and (pyro) Glu-His-Pro (NH$_2$) were increased and that there is no significant difference in the biological activity and potency of the natural and synthetic products.

In other tests, it was found that fifty but not twenty-five nanograms of both TRH and (pyro) Glu-His-Pro (NH$_2$) were effective in elevating the blood levels of TSH ten and fifteen minutes after intravenous injection in male rats weighing 250 g. which were anesthetized with urethane. The method employed was according to that described by Bowers et al., identified above, and revealed that the natural and synthetic products showed essentially equivalent potencies.

Both the natural and synthetic products were found to be indistinguishable by two important biological characteristics of TRH: (a) both were inactivated after incubation in human serum at 37° C. for fifteen minutes; and, (b) the degree of the biological response of mice to both the natural and synthetic compounds depended upon the amount of $T_3$ injected. Further, the synthetic product was found to be indistinguishable, in vitro from TRH and this response could be partially or completely inhibited by the addition of $T_3$ not only in vitro but also when $T_3$ was given in vivo. The plasma levels of TSH were found to increase within two minutes after intravenous injection of both products in mice and rats, the duration of the elevated levels of TSH being dependent upon the dosage.

It can be seen, therefore, that the hormonal activities and potencies of the synthetic and natural products are indistinguishable.

We claim:

1. A method for preparing the tripeptide, L-(pyro) glutamyl-L-histidyl-L-prolinamide, comprising: coupling the amino acid, histidine, with an amino acid selected from the group consisting of pyroglutamic acid and proline amide to obtain a dipeptide; and, coupling said dipeptide with the unreacted amino acid of said group to obtain the tripeptide, L-(pyro)-glutamyl-L-histidyl-L-prolinamide.

2. The method of claim 1 wherein said histidine is coupled first with said pyro-glutamic acid and the resulting dipeptide is then coupled with said proline amide.

3. The method of claim 1 wherein said histidine is coupled first with said proline amide and the resulting dipeptide is then coupled with said pyro glutamic acid.

4. A method for preparing the tripeptide, L-(pyro) glutamyl-L-histidyl-L-prolinamide comprising: coupling the amino acid, histidine, with an amino acid selected from the group consisting of pyroglutamic acid and proline amide to obtain a dipeptide, at least one of said amino acid reactants being in the protected form containing a protective member selected from the group consisting of carbobenzoxy, benzyl, N-t-butyloxy - carbonyl, and p-toluene-sulfonyl and, when said reactant is histidine, its imidazole nucleus is protected by a benzyl group; coupling said dipeptide with the remaining unreacted amino acid to obtain a tripeptide; and, removing all protective members from said tripeptide to obtain L-(pyro)-glutamyl-L-histidyl-L-prolinamide.

5. The method of claim 4 wherein said pyroglutamic acid and said histidine are in protected form and said proline amide is in unprotected form.

6. The method of claim 4 wherein said histidine is first coupled with said pyroglutamic acid and the resulting dipeptide is then coupled with said proline amide.

7. The method of claim 4 wherein said histidine is first coupled with said proline amide and the resulting dipeptide is then coupled with said pyroglutamic acid.

References Cited

UNITED STATES PATENTS

| 3,309,353 | 3/1967 | Boissonnas et al. | 260—112.5 |
| 3,093,627 | 6/1963 | Schwyzer et al. | 260—112.5 |
| 2,581,814 | 1/1952 | Plentl | 260—112.5 |
| 3,247,179 | 4/1966 | Schwyzer et al. | 260—112.5 |
| 3,400,118 | 9/1968 | Bodanszky et al. | 260—112.5 |

FOREIGN PATENTS

| 43/23,385 | 12/1968 | Japan | 260—112.5 |

OTHER REFERENCES

Schroder et al.: The Peptides, vol. I, Academic Press, New York (1965). pp. 193–194.

Morley: Peptides 1968, North Holland Publishing Co., Amsterdam (1968), pp. 251–255.

Burgus et al.: C.R. Acad. Sci., Pairs, Ser. D 268, 2116–2118 (1969).

Burgus et al.: C.R. Acad. Sci., Pairs, Ser. D 269, 226–228 (1969).

Guillemin: Pharmacology of Hormonal Polypeptides and Proteins, Back et al. eds., Plenum Press, New York (1968), pp. 148–157.

Schally et al.: Biochem. Biophys. Res. Commun. 25, 165–169 (1966).

Schally et al.: Recent Progress in Hormone Research 24, 510–525 (1968).

Schmeck: New York Times, vol. CXIX, No. 40,895, Jan. 11, 1970, Sec. 1, pp. 1 and 40.

ELBERT L. ROBERTS, Primary Examiner

U.S. Cl. X.R.

260—112.5